United States Patent [19]

Janowski et al.

[11] Patent Number: 5,601,271

[45] Date of Patent: Feb. 11, 1997

[54] PACKAGE RESTRAINING BARRIERS FOR CARGO COMPARTMENTS OF VEHICLES

[75] Inventors: Paul Janowski, Topanga; Terry A. Carter, Canoga Park, both of Calif.

[73] Assignee: Rx For Organization, Canoga Park, Calif.

[21] Appl. No.: 488,657

[22] Filed: Jun. 8, 1995

[51] Int. Cl.$^6$ .................................................. A47B 97/00
[52] U.S. Cl. ......................................................... 248/503
[58] Field of Search .................. 248/503, 95; 211/12; 224/925, 901, 534, 42.33

[56] References Cited

U.S. PATENT DOCUMENTS

| | | | |
|---|---|---|---|
| 4,189,056 | 2/1980 | Majewski | 211/195 |
| 5,129,612 | 7/1992 | Beaupre | 224/539 X |
| 5,161,700 | 10/1992 | Stannis et al. | 224/925 X |
| 5,215,205 | 6/1993 | Behlman | 224/925 X |
| 5,464,102 | 11/1995 | LeBlanc et al. | 224/925 X |

Primary Examiner—Ramon O. Ramirez
Attorney, Agent, or Firm—David O'Reilly

[57] ABSTRACT

An easy to use cargo restraining barrier device designed to keep items in a cargo area from moving around. The cargo restraining barrier is comprised of a vertical wall having peripheral flanges to hold and restrain packages. The flanges are provided with Velcro hook-type material to securely grip carpeting in a cargo storage area such as the trunk of a car. The flanges surrounding the vertical wall on the cargo restraining barrier also includes spikes, and are constructed to use the shape and weight of packages, boxes, food items or other items to hold the barriers in position. In the preferred embodiment the vertical wall and flanges are of a molded hollow plastic construction allowing multiple cargo restraining barriers to be stacked for storage. Optional embodiments provide hinged sections that fold to provide a vertical wall and flanges, and when unfolded, lie flat for storage.

10 Claims, 4 Drawing Sheets

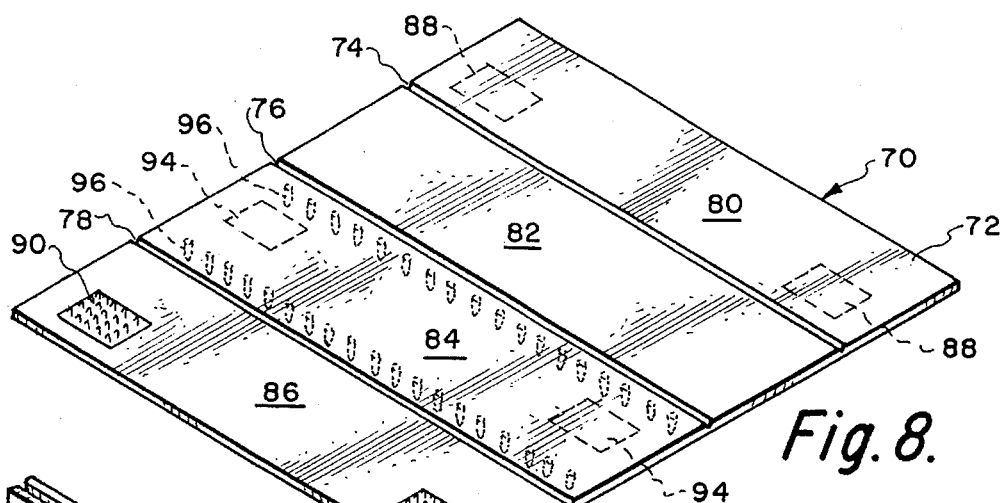
Fig. 8.
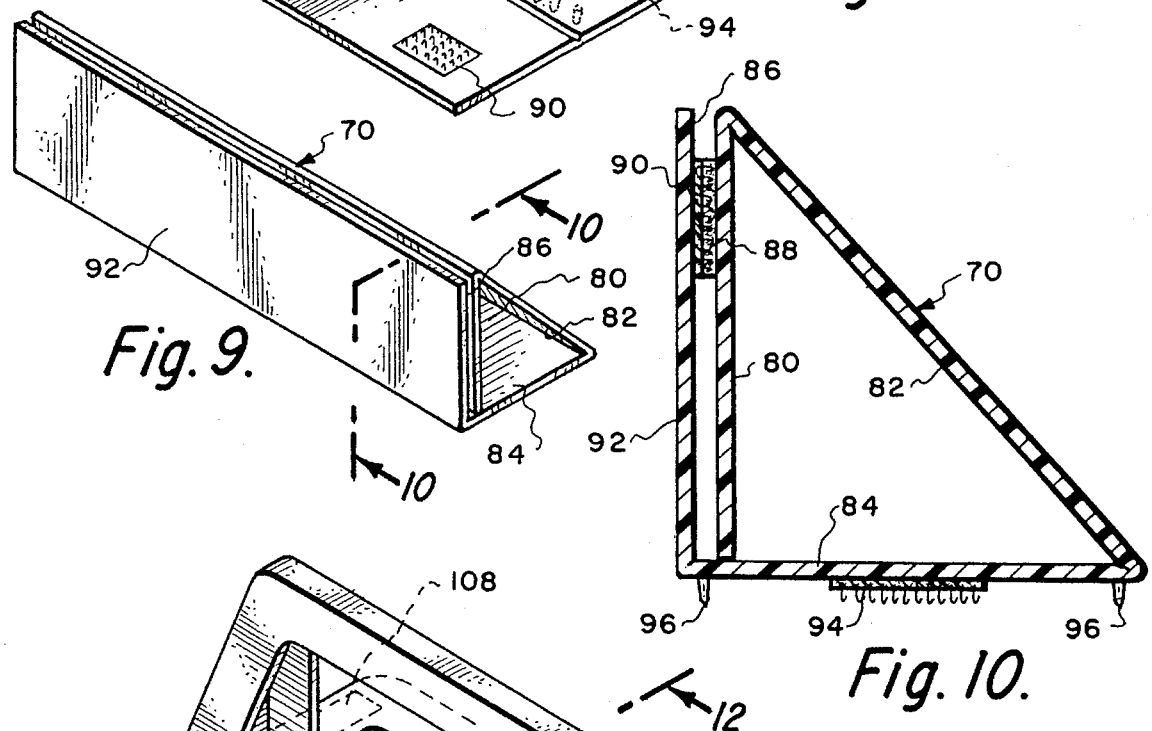
Fig. 9.
Fig. 10.
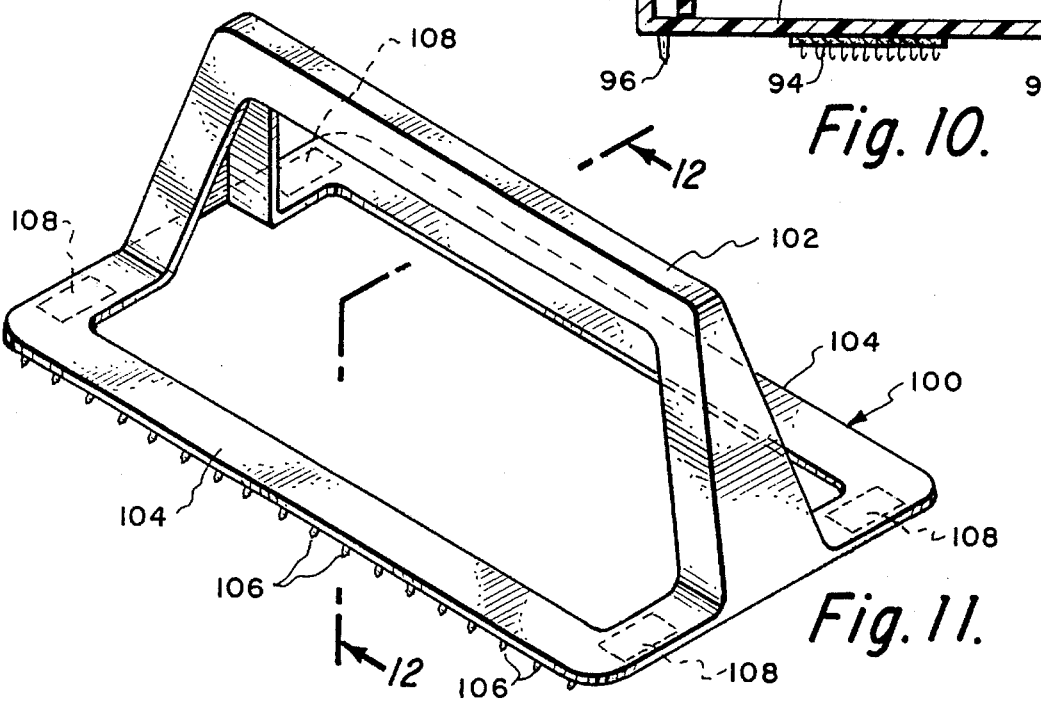
Fig. 11.

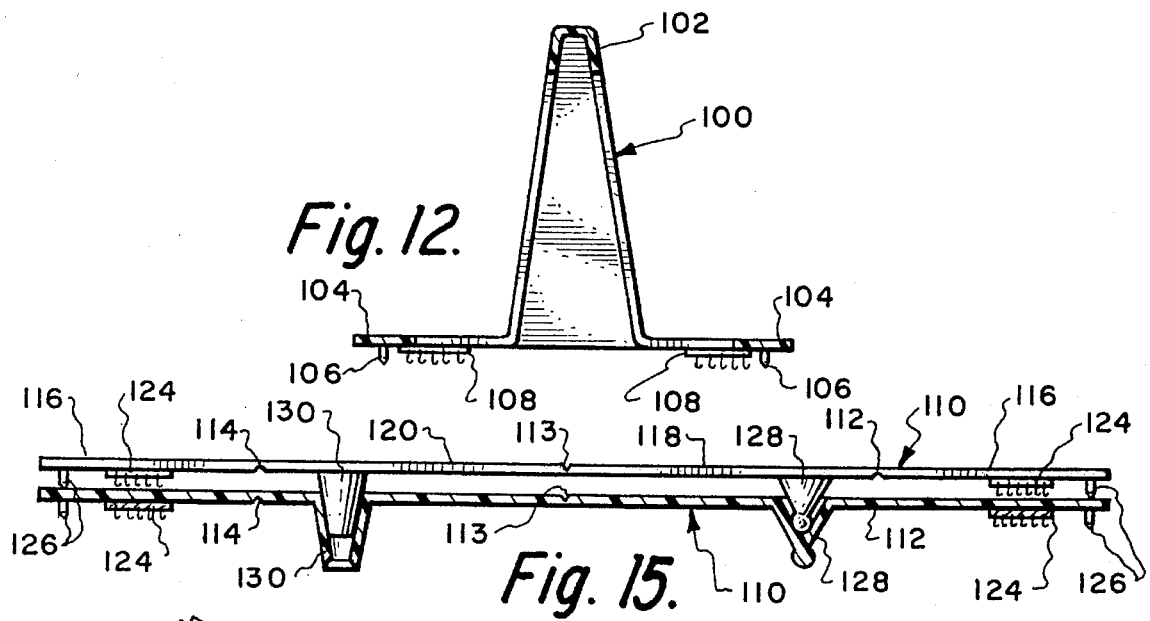
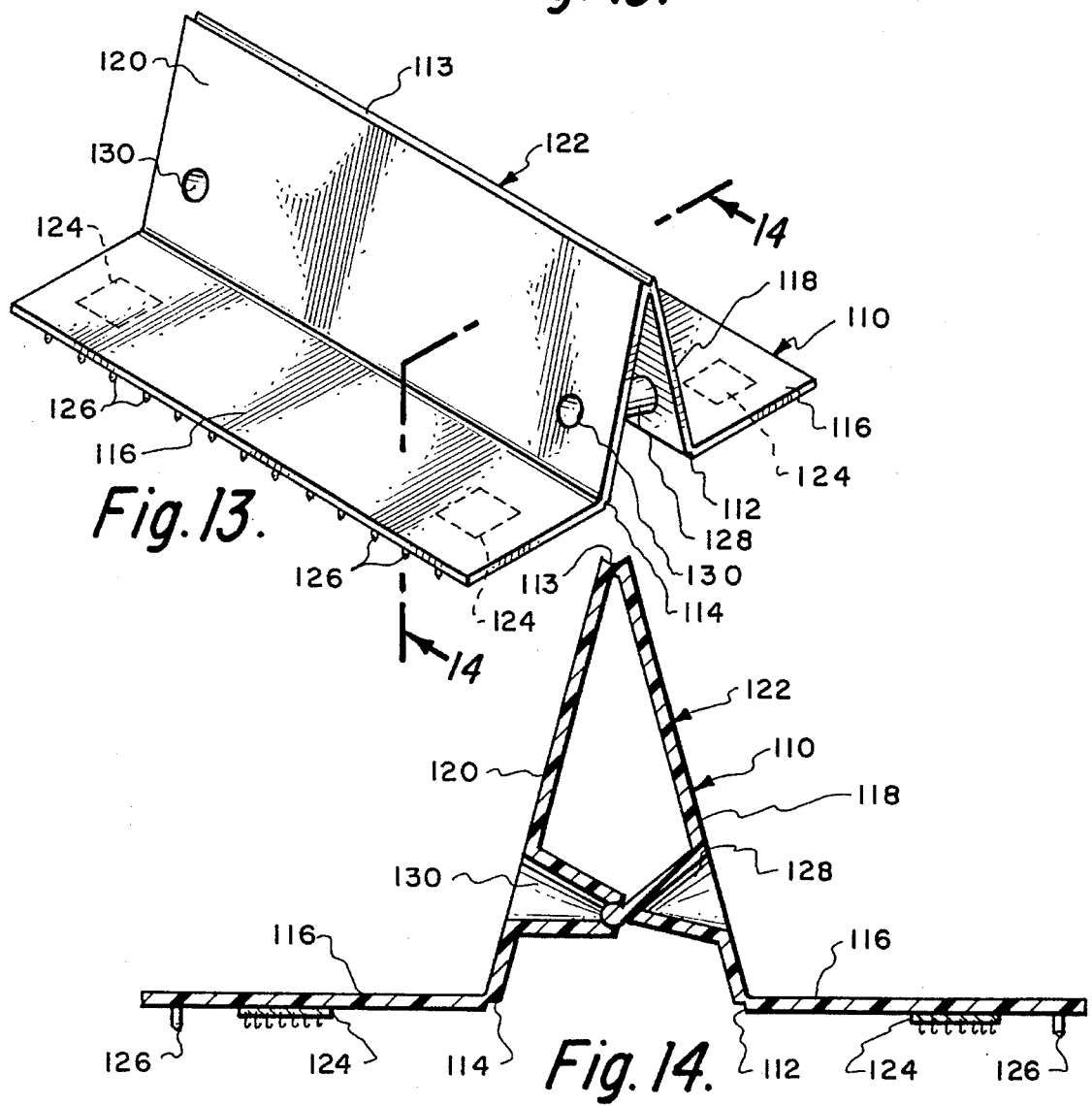

PACKAGE RESTRAINING BARRIERS FOR CARGO COMPARTMENTS OF VEHICLES

BACKGROUND OF THE INVENTION

1. Field of the Invention

This invention relates to devices for restraining packages carried in a cargo area, and more particularly relates to barriers that can be easily set-up and arranged to prevent packages carried in the cargo area of vehicles from tipping and moving around.

2. Background Information

Transportation of packages in the cargo areas of vehicles is sometimes difficult because of their varying shapes. They tend to fall over, roll around and can be damaged in transit. This problem is particularly acute with packages having various shapes, and containing miscellaneous items.

There is also a particular problem with miscellaneous items such as groceries and packages carried in grocery bags. One device available is in the form of a folding wall which, when unfolded, forms rectangular compartments that are approximately the size of the familiar grocery bag. While this will serve to somewhat restrain the grocery bags, it does not prevent the grocery bags, and other loose items from sliding or even tipping over and rolling around in the cargo compartment or trunk of a vehicle.

Without some type of barrier, groceries fall out of bags, tip over and containers can sometimes leak and even break. To prevent this, shoppers often try to position the bags in corners of the compartment with the heavier shopping bags on the outer perimeter to restrain those that might tip over and break. However, such packing is tedious and requires careful thought, and is often inadequate because it doesn't prevent the shopping bags from sliding around in the cargo area. Sudden stops, starts or sharp cornering can cause the cargo to slide from one side to the other of the cargo area resulting in damage to the packages. It would be advantageous if restraining barriers could be quickly set-up and arranged that would restrain movement or tipping of the packages carried in cargo areas or trunks of vehicles.

It is, therefore, one object of the present invention to provide cargo restraining barriers that can be quickly set-up and arranged to restrain packages, boxes or miscellaneous items being transported in the cargo area of vehicles.

Yet another object of the present invention is to provide a cargo restraining barrier having a peripheral flange that secures the barrier to the surface of a cargo area.

Still another object of the present invention is to provide a cargo restraining barrier having a peripheral flange that will incorporate material which holds the barrier in place in the cargo area of the vehicle.

Still another object of the present invention is to provide a cargo restraining barrier having a peripheral flange having Velcro hook-type material that will securely hold the barrier in place on carpeting in the trunk of a vehicle.

Yet another object of the present invention is to provide a cargo restraining barrier, having a plurality of molded spikes around the periphery of a flange on the barrier, to securely hold it in place in the cargo area of a vehicle.

Still another object of the present invention is to provide a cargo restraining barrier in the form of a molded, hollow wall having a peripheral flange so that the cargo restraining barriers can be stacked when not in use.

Yet another object of the present invention is to provide a cargo restraining barrier having a vertically formed wall and a peripheral flange with interlocking fasteners in the corners of the flange so that the adjacent restraining barriers can be fastened together.

Still another object of the present invention is to provide a cargo restraining barrier, constructed of a resilient, rigid plastic material having hinged sections allowing center sections to be raised to form a wall with restraining flanges on either side or lowered to be flat for storage.

Still another object of the present invention is to provide a cargo restraining barrier in the form of flat, flexible material hinged sections so that the flat, flexible material can be manipulated to form a vertical barrier.

BRIEF DESCRIPTION OF THE INVENTION

The purpose of the present invention is to provide a cargo restraining barrier that can be used to contain packages in the cargo area or trunk of a vehicle. The cargo restraining barrier includes fastening materials that hold it in place in the cargo area preventing packages from sliding or tipping.

The cargo restraining barrier is an organizer that can be used in passenger vans, recreational vehicles, motor homes, trailers, boats, etc., or any vehicle that has a cargo area, and particularly vehicles that have a carpeted cargo area. The cargo restraining barrier utilizes a peripheral flange on a pre-formed molded hollow vertical wall having a combination of devices to hold it in place in the cargo area. One method is to use Velcro hook material fastened to the bottom of the flange which will "stick" to carpeting in the cargo area of a vehicle. Another, but preferred variation of the invention includes a plurality of spikes along the opposite edges of the peripheral flange to assist in holding the device in place. Another option is to use non-permanent adhesives that provide a tacky surface to hold the barrier in place.

The cargo restraining barrier has a peripheral flange, lip or ledge that is also constructed to interlock with adjacent barriers to form a unitary barrier. Each corner is provided with a socket or pin for interlocking with an adjacent corner. This keeps the barriers together as a unit to help prevent them from moving.

Other options include forming the barrier as a resilient, rigid sheet of material with scored channels to provide hinged sections. The undercut or scored channels provide self-hinges that allow the sheet material to be folded or articulated to provide a vertical barrier. Opposite ends of the flat sheet provide flanged hinged sections that allow the sections to come together to form a vertical wall or barrier. Various designs are disclosed to provide a cargo restraining barrier from hinged sections that can be folded to provide a vertical restraining wall. Other options include a construction which allows the use of a minimum material to reduce cost and still allow the cargo restraining barriers to easily stack when not in use.

The cargo restraining barrier uses the peripheral flange, lip or ledge around the wall to firmly hold the position of the barrier in various vehicle cargo areas. In the automotive field, where the trunk has a carpet, the flanges are provided with Velcro hook material beneath the flange that will securely grip the surface of the carpet. Optionally, spikes along each edge of the flanges can also assist in securing the barriers.

When mounted in the cargo area or trunk of a vehicle the barrier shape, plus the weight of packages, boxes of food, containers and the like sitting on the flanges resist shear forces against the barrier preventing lateral movement of items designed to be secured by the cargo restraining barrier. Items such as boxes, grocery bags (both paper and plastic), food items (i.e., casserole dishes, cakes) or any items being transported in a vehicle cargo area are securely restrained preventing them from making any potential mess within the vehicle. The device can also prevent damage to restrain any fragile cargo by keeping packages and articles from sliding around in the automobile trunk or cargo area.

The above and other novel features of the invention will be more fully understood from the following detailed description and the accompanying drawings, in which:

BRIEF DESCRIPTION OF THE DRAWINGS

FIG. 8 is a perspective view of a third embodiment of a cargo restraining barrier constructed according to the invention.

FIG. 9 is a perspective view of the cargo restraining barrier of FIG. 8 folded for use.

FIG. 10 is a sectional view of the cargo restraining barrier taken at 10—10 of FIG. 8.

FIG. 11 is a perspective view of a cargo restraining barrier showing a variation of the embodiment of FIG. 1.

FIG. 12 is a sectional view taken at 12—12 of FIG. 11.

FIG. 13 is a perspective view of a cargo restraining barrier showing a variation of the embodiment of FIGS. 5 through 7.

FIG. 14 is sectional view taken at 15—15 of FIG. 13.

FIG. 15 is a sectional view illustrating how the fifth embodiment of FIGS. 13 and 14 when folded flat, would stack one on the other.

DETAILED DESCRIPTION OF THE INVENTION

Figure 1:
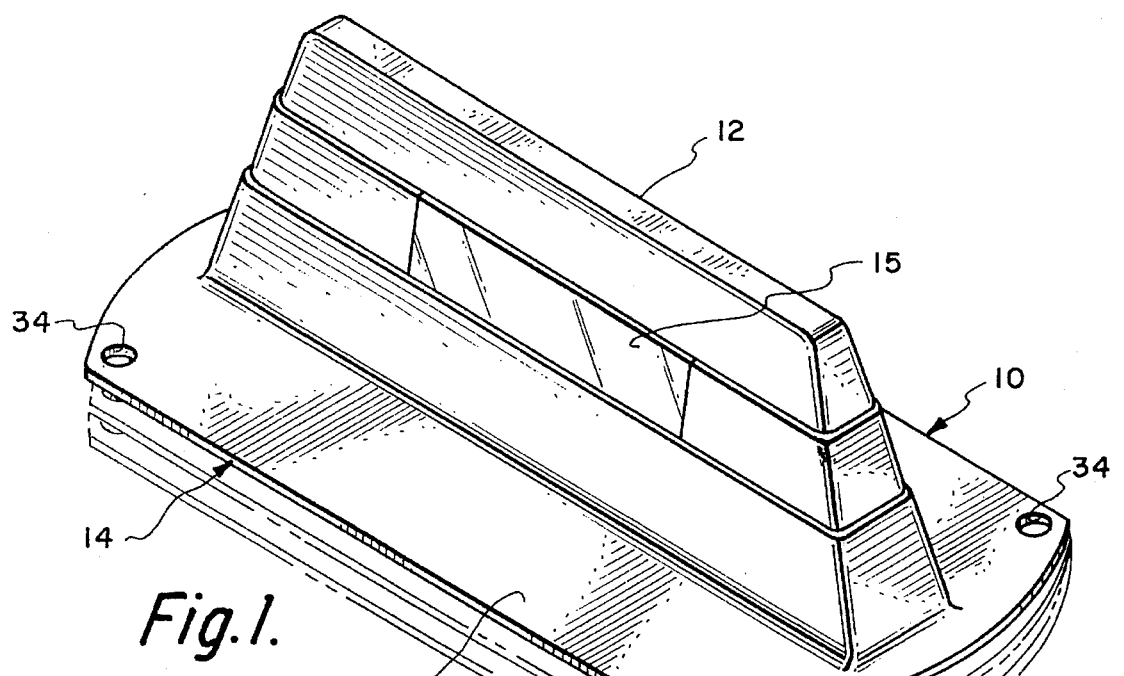
FIG. 1 is a perspective view illustrating a cargo restraining barrier constructed according to the invention in a stacked arrangement.
Figure 2:
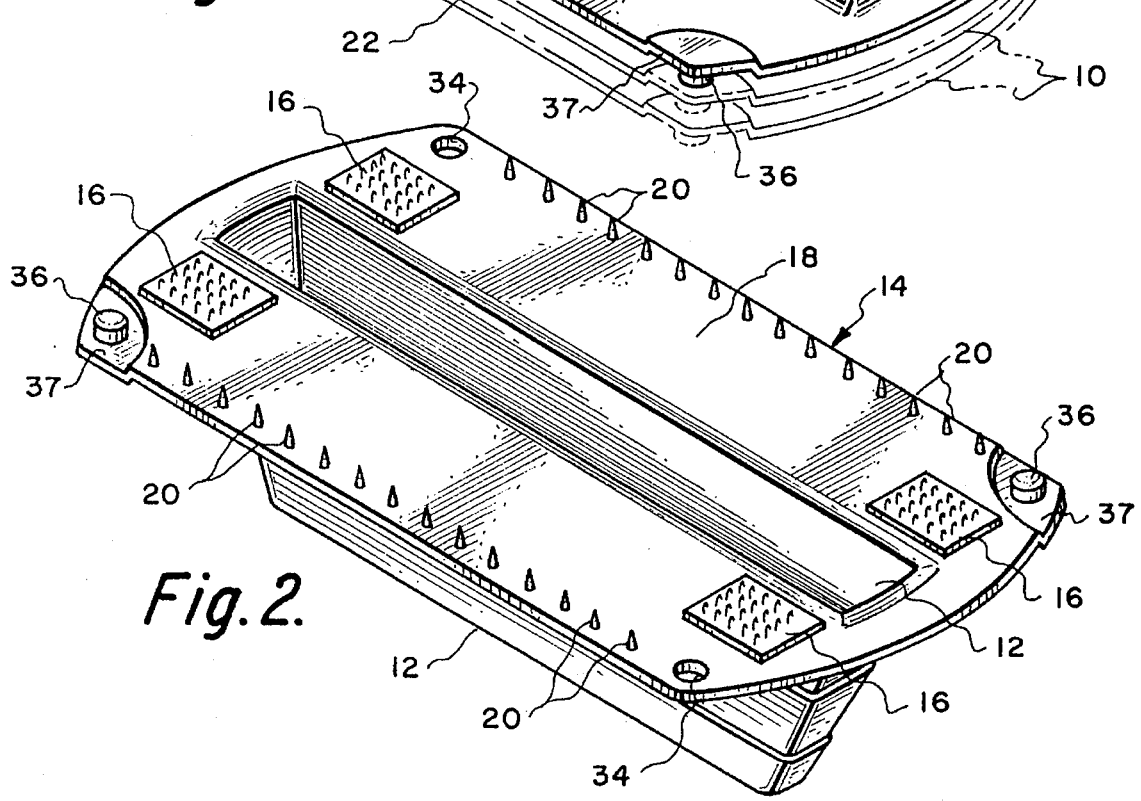
FIG. 2 is a bottom view of a cargo restraining barrier of FIG. 1.

A preferred embodiment of a cargo restraining barrier constructed according to the invention is illustrated in FIGS. 1 and 2. Cargo restraining barrier 10 is constructed to provide a hollow vertical restraining wall 12 having a flange or lip 14. Preferably, cargo restraining barrier 10 is of a molded resilient plastic construction with vertical wall 12 being hollow to allow several cargo restraining barriers 10 to be stacked when not in use, as illustrated in FIG. 1.

Gripping surfaces are provided beneath flanges 14 to help hold cargo restraining barriers 10 in place. Preferably Velcro-type hook material pads 16 are attached to the underside 18 of flange 14. Velcro material is generally in the form of hooks and loops. In this case, carpeting in the cargo area will form the loop material which will be gripped by the hooks in pads 16 and fastened to the underside 18 of flange 14 with an adhesive. Hook material pads 16 can be individual pads at each corner as illustrated, or could be lengthwise strips to provide more gripping surface.

In some cases, the cargo areas may have carpeting that will not be gripped securely by the hooks in hook material pads 16. For these types of surfaces, a plurality of spikes provided along opposite edges of flanges 14. The combination of packages sitting on the upper surface 22 of flanges 14 and spikes 20 being pressed into the surface of the carpeting or other material securely hold the cargo restraining barrier 10 in place to prevent packages from tipping or sliding around the cargo area.

Optionally, hook material pads could be pads having a sticky or gummy material for holding on a somewhat smooth surface. In yet another option, pads 16 could be magnetic to hold the barriers in place in the metal cargo areas of pick-up trucks and the like.

Figure 3:
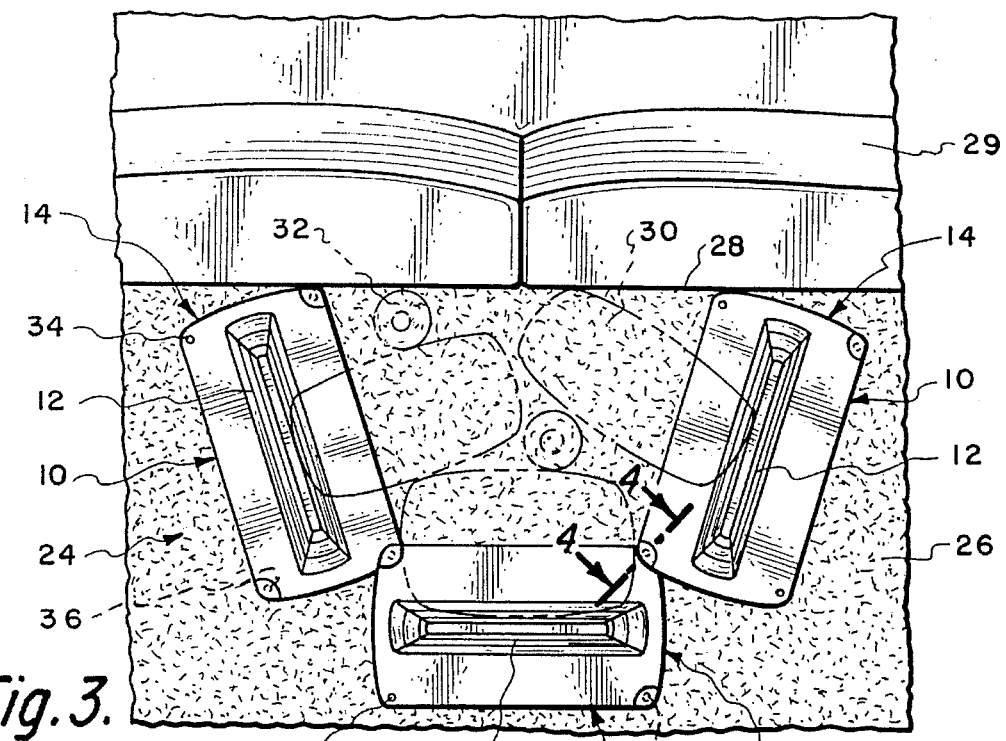
FIG. 3 is a partial section of a vehicle cargo area illustrating use of the cargo restraining barrier.

A partial sectional view of a cargo area, with cargo restraining barriers in position to hold packages in place, is illustrated in FIG. 3. The partial section of FIG. 3 illustrates a carpeted cargo area 24 typically found in the trunk of an automobile. Cargo area 24 illustrates the portion of the forward end of the trunk, which has carpeting 26 and a wall 28 provided by the rear of seats 29 in the vehicle. Cargo restraining barriers 10 are positioned end-to-end using wall 28 in cargo area 24 as a restraining surface. Packages such as grocery bags 30 and containers 32 are secured by placing cargo restraining barriers 10 end-to-end with forward ends abutting rear wall 28 of cargo area 24. Optionally, a sidewall or other surface could be used to assist in holding packages 30 and 32 in place. Further, packages 30, such as grocery bags, are positioned to sit on flanges 14 to press the flanges firmly into carpet 26 holding the cargo restraining barriers 10 in place.

Figure 4:
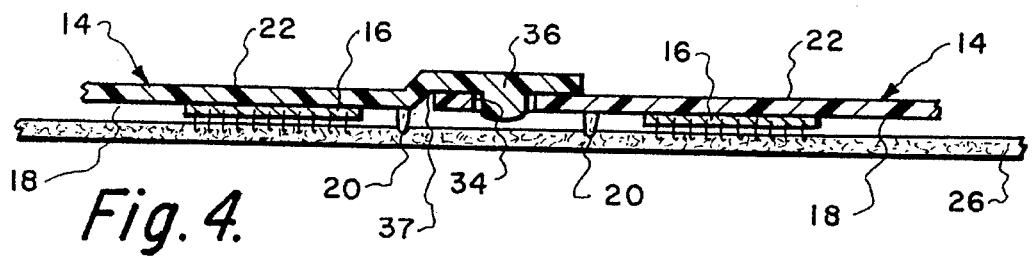
FIG. 4 is a sectional view taken at 4—4 of FIG. 3.

An optional feature of the invention is to provide interlocking corners on cargo restraining barriers 10 as illustrated in FIGS. 1 through 4. Interlocking corners are comprised of sockets 34 in opposite angle corners, and mating posts 36 in recesses 37 in diagonally opposite corners. When cargo restraining barriers 10 are in position, as shown in FIG. 3, a post 36 (on one corner) will seat in socket 34 in an adjoining corner as shown in the partial sectional view of FIG. 4. By interlocking the corners, as shown in FIG. 4, the three cargo restraining barriers 10 act as a unit. However, in most cases, hook material pad 16 and spikes 20 will be sufficient to hold cargo restraining barriers 10 in place.

Another option is to secure reflectors 15 (FIG. 1) to the sides of hollow vertical wall 12. This would allow cargo restraining barriers to be used as warning devices during vehicle breakdowns. The reflective barriers could be placed in the rear window of a vehicle or in front, behind or adjacent a disabled vehicle. Another option is to embed a reflective material in the plastic forming hollow material wall 12.

Figure 5:
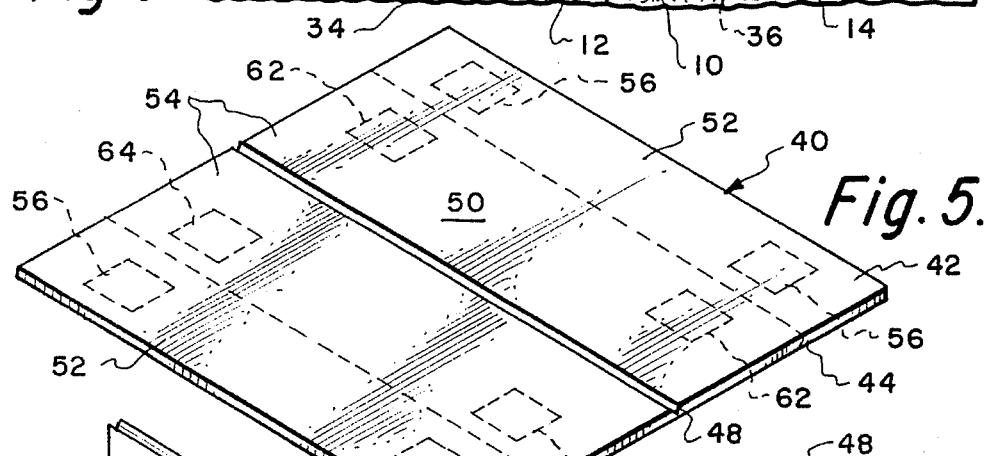
FIG. 5 is a perspective view of a second embodiment of the cargo restraining barrier according to the invention.
Figure 6:
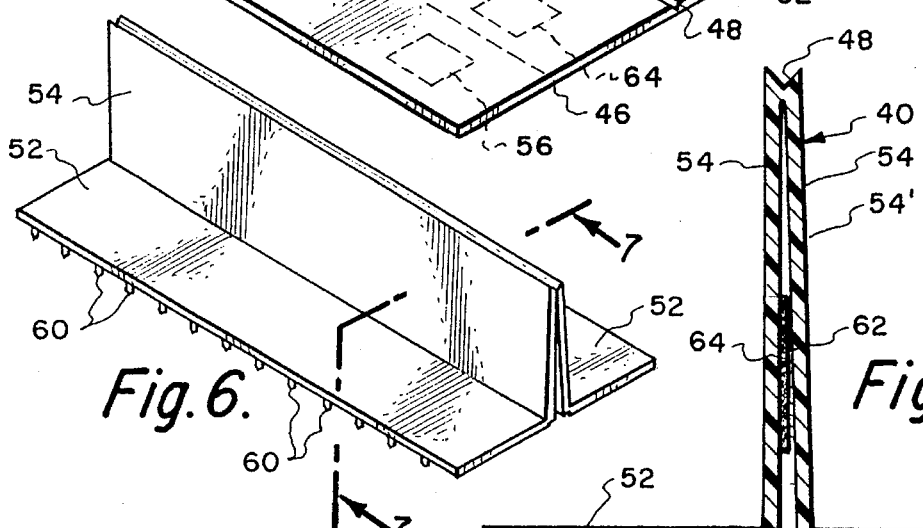
FIG. 6 is a perspective view of the second embodiment of the cargo restraining barrier of FIG. 5 folded for use.
Figure 7:
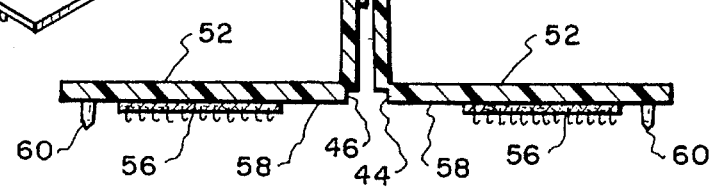
FIG. 7 is a sectional view of the cargo restraining barrier taken at 7—7 of FIG. 6.

A second embodiment of the invention is illustrated in FIGS. 5 through 7. In this embodiment, cargo restraining barrier 40 is in the form of a flat sheet of material which is preferably a rigid, but somewhat resilient plastic or similar material. Sheet 42 has undercut grooves 44 and 46 on a lower surface and single centrally located undercut groove or slot 48 formed in upper surface 50. Undercut grooves 44, 46 and 48 essentially divide sheet 42 into four hinged sections illustrated by the dotted line extending across Sheet 42 at undercut grooves 44 and 46. Hinged sections 52 at opposite ends of sheet 42, provide flanges while hinged sections 54 in the center, form the vertical wall or barrier as shown in FIGS. 6 and 7. Cargo restraining barrier 40 is formed by folding flat sheet 42 at hinges formed by undercut grooves 44, 46 and 48 to erect vertical wall 54' from center sections 54. Hinged end sections 52 then form lengthwise securing flanges.

Loop material pads 56 are secured on the underside 58 of flanges 52 to secure cargo restraining barrier 40 in place, as in the embodiment of FIGS. 1 through 4. Spikes 60 may also be formed along opposite edges of flanges 52 as before, if desired.

Loop material pads 56 and spikes 60 will hold vertical wall 54' comprised of sections 54 in a vertical position when in use. However, to maintain that position, an optional but preferred feature is the inclusion of Velcro hook and loop material on the underside of sections 54 which will assist in holding the section together and maintaining the vertical position of vertical wall 54'. Preferably, hook and loop material is in the form of Velcro pads 62 and 64 at opposite ends on the underside of sections 54, as shown by dotted lines in FIG. 5. As shown in FIG. 7, hook and loop pads 62 and 64 mate when sheet 42 is folded in the position shown. This embodiment, of the cargo restraining carrier, is used in the same manner as the first embodiment shown in FIG. 3. Cargo restraining barriers 40 would be placed in cargo area 24 of a vehicle trunk and positioned against a wall or side to restrain packages, preventing them from tipping or sliding around the cargo area.

A third embodiment is illustrated in FIGS. 8 through 10. In this embodiment, cargo restraining barrier 70 is again comprised of a flat sheet 72 of some resilient rigid material such as a resilient plastic material, or any other suitable rigid material that can be constructed as shown. Lengthwise undercut grooves 74, 76 and 78 are provided in the surface of sheet 72. This divides sheet 72 into hinged sections 80, 82, 84 and 86 that will fold or roll-up as illustrated in FIGS. 9 and 10. Hinged section 80 is rolled-up toward hinged sections 82 and 84 until the underside of section 80 mates with the upper side of section 86, as shown in FIG. 10. Velcro pads 88 and 90, on the underside of section 80 and the upper side of section 86 respectively, mate as illustrated in FIG. 10.

Velcro hook material 94, secured to the underside of hinged section 84, provides a holding material to grip carpeting in a trunk as in the prior embodiments. Additionally, spikes 96 may be formed along each edge of the underside of section 84 if desired. The advantage of the embodiments illustrated in FIGS. 5 through 7 and 8 through 10 is that they may be laid flat when not in use to minimize the amount of storage space they occupy.

A variation of the embodiment of FIGS. 1 through 4 is illustrated in FIGS. 11 and 12. This design reduces the amount of material used for manufacture to significantly reduce construction costs. In this embodiment, cargo restraining barrier 100 has vertical wall 102, formed of a hollow construction as before, except that the vertical wall 102 is in the form of an open frame. Vertical wall 102 is attached to flanges 104 along opposite sides to hold hollow vertical wall 102 in an upright position. Spikes 106 are formed along opposite edges of flanges 104, and Velcro hook material pads 108 are secured beneath flanges 104 as before. The open hollow allows the cargo restraining barriers to be stacked as illustrated in FIG. 1, but use much less material in their manufacture which can reduce the cost of production.

FIGS. 13 through 15 illustrate an optional construction of the embodiment of FIGS. 5 through 7. A cargo restraining barrier 110 is formed of a flat sheet of material as before, having undercut grooves 112, 113 and 114 forming hinged sections 1–6 acting as flanges along either side. Sections 116, 118, 120 and 122 when folded, form vertical wall 122. Flanges 116 have hook material pad 124 and spikes 126 as before to hold cargo restraining barrier 110 in position in a cargo storage area. However, to hold vertical wall 22 in a vertical position, sections 118 and 120 are provided with interlocking fasteners provided by a ball 128 and socket 130 fastener. When flanges are folded, raising sections 118 and 120, fastening ball 128 mates with socket 130 holding section 118 and 120 in a substantially vertical position to produce restraining wall 122.

Loop material pads 124 and spikes 126 hold cargo restraining barrier 110 in position in a cargo area 24 in the same manner as the original embodiment illustrated in FIG. 1.

The ball and socket fastener, utilized in the embodiment of FIGS. 13 and 14, allow the cargo restraining barrier 110 to be laid flat for storage in the smallest possible space as shown in FIG. 15. FIG. 15 is a partial sectional view of one of the cargo restraining barriers 110 to illustrate the method of stacking several cargo restraining barriers. Ball 128 and socket 130 are formed on hollow conical sections on the cargo restraining barrier 110, which seat within one another when the cargo restraining barrier is folded flat. This allows several of these cargo restraining barriers to be stored in a very small space.

Thus, there has been disclosed, a cargo restraining barrier that is simple in construction and easy to use. In addition, each embodiment allows the cargo restraining barrier to be easily stored when not in use. In the first embodiment the cargo restraining barrier is formed of a molded hollow construction providing a vertical barrier and lengthwise flanges having Velcro hook-type material to securely hold the cargo restraining barrier in place in the trunk of an automobile or other cargo area. In several optional embodiments, the barrier is formed of flat material having undercut grooves having hinged sections that allow the flat material to be folded to provide a vertical wall with flanges having Velcro hook material to secure the cargo restraining barrier in the cargo area of an automobile or other cargo areas. The flat material, when folded, provides a vertical wall and a base having hook material pads that grip carpeting in automobile trunks or other similar cargo carrying areas.

This invention is not to be limited by the embodiment shown in the drawings and described in the description which is given by way of example and not of limitation, but only in accordance with the scope of the appended claims.

What is claimed is:

1. A cargo restraining barrier device comprising;

a vertical wall;

flange means along opposite sides of said vertical wall;

gripping means on an underside of said flange means;

said vertical wall constructed to allow said cargo restraining barriers to be stacked for storage in as small a space as possible;

whereby a plurality of said cargo restraining barriers positioned around packages being transported and in abutment with a wall of a cargo area securely hold said packages in place preventing them from sliding or tipping.

2. The device according to claim 1 in which said gripping means comprises Velcro hook material secured beneath said flange means.

3. The device according to claim 2 in which said gripping means includes a plurality of spikes along opposite edges of said flange means.

4. The device according to claim 3 in which said vertical wall and flange means are formed in an integrally molded construction with said vertical wall being hollow so that said cargo restraining barriers may be stacked one on another.

5. The device according to claim 3 including reflective means on opposite sides of said vertical wall.

6. The device according to claim 5 in which said reflective means comprises a reflector secured to opposite sides of said vertical wall.

7. The device according to claim 1 in which said gripping means comprises a plurality of spikes along opposite edges of said flange means.

8. The device according to claim 1 in which said vertical wall is an open frame hollow construction.

9. The device according to claim 1 in which said gripping means comprises an adhesive sticky material secured beneath said flange means.

10. The device according to claim 1 in which said gripping means comprises magnetic means secured beneath said flange means.

* * * * *